(No Model.)
J. STRAITON.
APPARATUS FOR CLEANING SKINS.
No. 425,112. Patented Apr. 8, 1890.
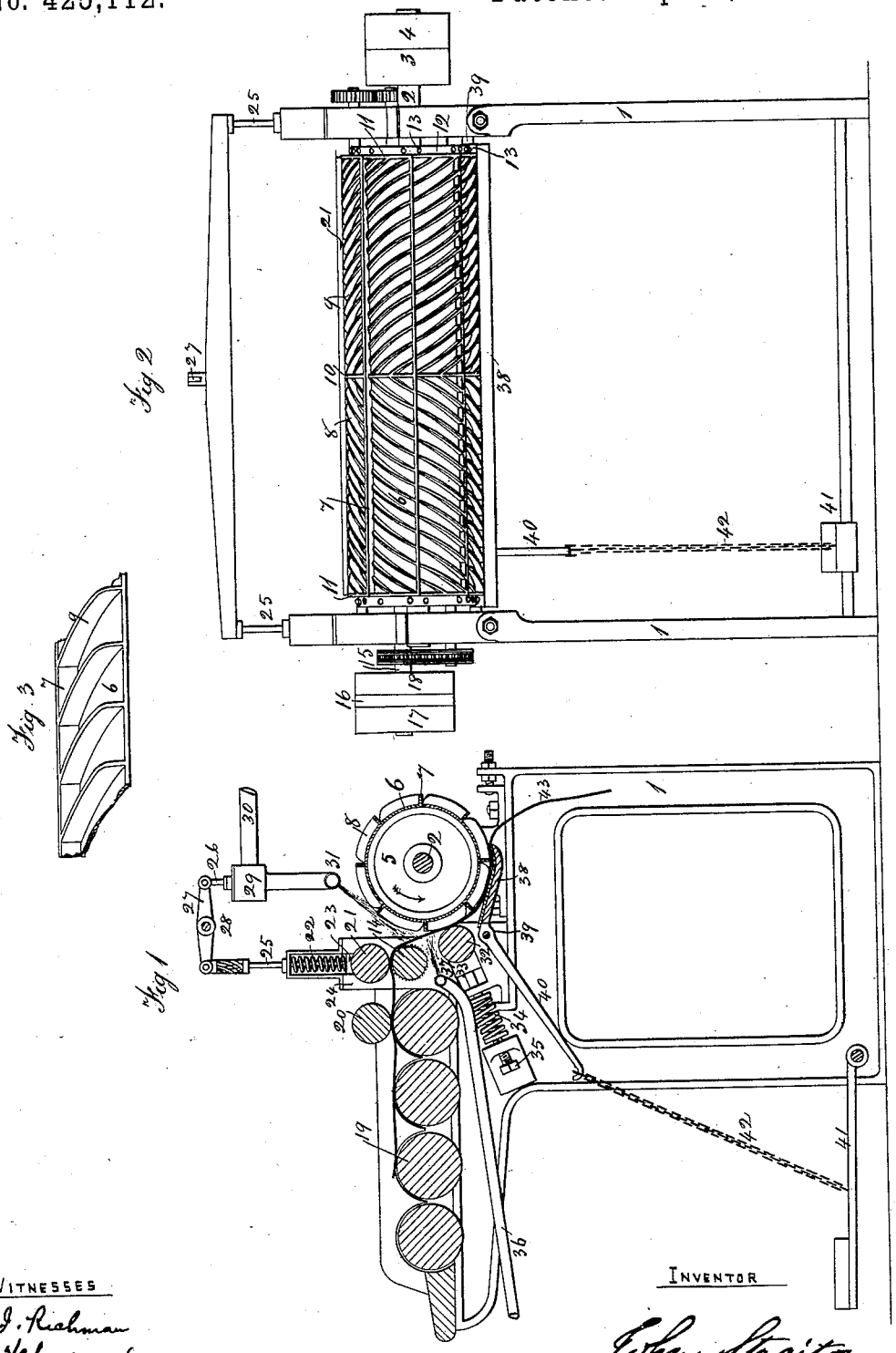
WITNESSES
J. Richman
H. Sudden
INVENTOR
John Straiton

UNITED STATES PATENT OFFICE.

JOHN STRAITON, OF BOOTLE, COUNTY OF LANCASTER, ENGLAND.

APPARATUS FOR CLEANING SKINS.

SPECIFICATION forming part of Letters Patent No. 425,112, dated April 8, 1890.

Application filed July 1, 1889. Serial No. 316,154. (No model.) Patented in England December 24, 1886, No. 16,894.

*To all whom it may concern:*

Be it known that I, JOHN STRAITON, of Bootle, in the county of Lancaster, England, have invented a new and useful Improvement in Apparatus for Burring and Cleaning Hairy and Woolly Skins, (for which I have obtained a patent in Great Britain, No. 16,894, bearing date December 24, 1886;) and I do hereby declare the following to be a full, clear, and exact description thereof.

The invention relates to apparatus for washing and for removing burrs and foreign matter from hair and wool coated skins and for striking or softening such skins.

The main objects are to economize water, to render the action of the apparatus more certain and uniform, and to enable tender or damaged skins to be treated without danger of injury thereto.

Figure 1 is a transverse section, and Fig. 2 a back view, of my improved apparatus; and Fig. 3 is an enlarged view of the blades or beaters.

1 are metal side frames tied together by cross-bearers and bolts and nuts in any usual manner.

2 is a shaft carried in bearings in the frames 1, and provided with fast and loose pulleys 3 4. 5 are metal disks keyed on the said shaft 2 in any usual way.

6 are segmental pieces made each with a transverse blade or beater 7, from which project diagonal blades or beaters 8 9, running in opposite directions; 10, a mid-feather separating one set of diagonal blades 8 from the other set 9; 11, end ribs. The ends of the segmental pieces 6 rest on the disk 5 and are secured in position by hoops 12, which fit over the ends of the segments and are fastened to the disks 5 by set-screws 13. The segmental pieces are preferably made of cast-steel, and when united together form a drum, which is caused to rotate in the direction of the arrow by a belt on the fast pulley 3, and 14 a fluted metal roller formed with or secured to a shaft 15, carried in bearings in the side frames 1. The said shaft is fitted with a loose pulley 16 and two fast pulleys 17 18, so that by means of a fair lead and crossed belt the said roller may be caused to rotate in opposite directions.

19 are four rollers, preferably of wood, carried by shafts free to rotate in bearings in the side frames 1, and driven by a chain or any suitable gear from the roller 14 and in the same direction as the said roller; 20, a guard-roller resting on the rear roller 19 to prevent dirty water from traveling back along the skins, and 21 a nipping-roller resting on the roller 14 and pressed against it by springs 22. The springs 22 act on the bearings 23 of the roller-shaft 21, which are free to slide in guides 24.

25 is a rod resting on one bearing 23 and coupled to a valve-rod 26 by a lever 27, pivoted at 28 to any suitable support; 29, a valve-box; 30, a water-supply pipe, and 31 a water-discharge way, consisting of a perforated pipe running parallel to and equal in length to the drum 6. When the roller 21 is held away from the roller 14 by the thickness of a skin, the valve is open and water flows out of the pipe 31. When the roller 21 rests against the roller 14, the valve is closed and water cut off.

32 is a pressing-roller carried in bearings 33, free to move in guides in the frames 1, and 34 a spring acting on the bearings 33 for pressing the roller toward the drum 6. The roller 20 is driven by chain-gear from the roller 19 and in the same direction.

35 is the adjusting-screw; 36, a water-supply pipe to the perforated distributer 37, which runs the length of the drum 6; 38, a curved trough-plate pivoted at 39 to the frames 1 and provided with an arm 40, connected to a treadle 41 by a chain 42, and 43 a skin being cleaned.

The apparatus is used as follows: The drum 6 is caused to rotate. A skin is laid on the rollers 19, and the front edge is passed under the roller 20 and between the rollers 21 and 14. The roller 19 is then caused to rotate, and the front edge of the skin is carried down between the roller 32 and the drum until half the skin has passed the said drum and has been cleaned by the action of the water and the beaters on the drum. The roller 19 is then reversed and the skin is drawn back. The rear edge of the skin is then passed between the rollers 14 and 21, and the other half is cleaned. When very dirty skins are being cleaned, the treadle 41 is depressed and the trough-plate 38 caused to press the skin against the drum.

I claim—

1. In apparatus for cleaning skins, a rotating drum constructed of segments, each segment having at one edge a transverse flange and a series of projecting blades extending diagonally across the face of each segment and running in opposite directions on each side of a mid-feather or annular flange situate about midway from each end, said flanges and blades forming beaters for burring and cleaning skins, substantially as described.

2. In an apparatus for cleaning skins, the combination, with a rotary beater-drum, of a fluted rotary feed-roller adapted to be reversed, a spring-pressed nipping feed-roller, a spring-pressed roller, and curved trough-plate for holding the skin in contact with the beater-drum, said trough-plate located in rear of the spring-pressed roller and capable of being pressed against said beaters by suitable treadle mechanism, substantially as and for the purposes described.

3. In an apparatus for cleaning skins, the combination, with a rotary scouring-drum and feeding-roll, of a spring-pressure nipping feed-roller, a valved water-supply pipe, means for operating said valve from the nipping-roll, and a curved trough-plate corresponding in curvature to the periphery of the scouring-drum and adapted to be pressed with greater or less force against the surface of said scouring-drum, substantially as and for the purposes described.

4. In an apparatus for cleaning skins, the combination, with a scouring-drum, of an automatically-adjustable nipping-roller, a valved water-supply pipe, and intermediate mechanism for automatically operating said valve from the nipping-roller, substantially as and for the purposes described.

5. In combination with a rotary beater-drum for burring and cleaning skins and, apparatus for passing the skins through the machine in contact therewith, a pipe and valve for supplying water thereto, and an arm or lever connected with said valve resting upon the skin and raised thereby to open the valve, substantially as and for the purposes described.

In testimony whereof I, the said JOHN STRAITON, have hereunto set my hand.

JOHN STRAITON.

Witnesses:
J. RICHMAN,
T. C. SUDDEN.